US012745209B2

(12) United States Patent
Zhu et al.

(10) Patent No.: US 12,745,209 B2
(45) Date of Patent: Sep. 22, 2026

(54) INFORMATION TRANSMISSION METHOD AND APPARATUS

(71) Applicant: Huawei Technologies Co., Ltd., Shenzhen (CN)

(72) Inventors: Yonghe Zhu, Shanghai (CN); Yu Zeng, Shanghai (CN); Tingting Geng, Shenzhen (CN); Qinghai Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 181 days.

(21) Appl. No.: 18/778,254

(22) Filed: Jul. 19, 2024

(65) Prior Publication Data

US 2024/0373398 A1 Nov. 7, 2024

Related U.S. Application Data

(63) Continuation of application No. PCT/CN2023/072694, filed on Jan. 17, 2023.

(30) Foreign Application Priority Data

Jan. 21, 2022 (CN) ......................... 202210071576.1

(51) Int. Cl.
*H04W 64/00* (2009.01)
*H04W 92/18* (2009.01)

(52) U.S. Cl.
CPC ............ *H04W 64/00* (2013.01); *H04W 92/18* (2013.01)

(58) Field of Classification Search
None
See application file for complete search history.

(56) References Cited

U.S. PATENT DOCUMENTS

2014/0094192 A1* 4/2014 Annett ................ H04W 64/003 455/456.3
2015/0289127 A1 10/2015 Ou et al.

FOREIGN PATENT DOCUMENTS

CN 110113706 A 8/2019
WO 2016135791 A1 9/2016
WO 2021072843 A1 4/2021
WO 2022011704 A1 1/2022
WO 2022012486 A1 1/2022

OTHER PUBLICATIONS

CMCC (Rapporteur): "Further discussion on high-level AI framework." 3GPP TSG-RAN WG3 #111e, Online, Jan. 25-Feb. 5, 2021. R3-210917, total 4 pages.

* cited by examiner

*Primary Examiner* — Suhail Khan
(74) *Attorney, Agent, or Firm* — Slater Matsil, LLP

(57) ABSTRACT

Example methods and apparatuses are provided. An example method includes receiving first indication information. The first indication information indicates that a trajectory of a first terminal device matches a trajectory of a second terminal device. The method further includes sending second indication information to the first terminal device. The second indication information indicates to change a trajectory information reporting periodicity to a second periodicity, or the second indication information indicates to suspend trajectory information reporting. The second periodicity is greater than a first periodicity, and the first periodicity is the trajectory information reporting periodicity before the first indication information is sent.

20 Claims, 5 Drawing Sheets

INFORMATION TRANSMISSION METHOD AND APPARATUS

CROSS-REFERENCE TO RELATED APPLICATIONS

This application is a continuation of International Application No. PCT/CN2023/072694, filed on Jan. 17, 2023, which claims priority to Chinese Patent Application No. 202210071576.1, filed on Jan. 21, 2022. The disclosures of the aforementioned applications are herein incorporated by reference in their entireties.

TECHNICAL FIELD

This disclosure relates to the field of communication technologies, and in particular, to an information transmission method and an apparatus.

BACKGROUND

In a wireless communication network, for example, in a 5th generation (5G) communication system, services supported by the network are increasingly diversified, and therefore, requirements that need to be met are increasingly diversified. For example, the network needs to be capable of supporting an ultra-high rate, ultra-low latency, and/or an ultra-large connection. This feature makes network planning, network configuration, and/or resource scheduling increasingly complex. In addition, because a function of the network is increasingly powerful, for example, an increasingly high spectrum, a high-order multiple-input multiple-output (MIMO) technology, and new technologies such as beamforming and/or beam management are supported, network energy saving becomes a hot research topic. These new requirements, scenarios, and features bring an unprecedented challenge to network planning, operation and maintenance, and efficient operation. To meet the challenge, an artificial intelligence technology may be introduced into the wireless communication network, to implement network intelligence.

SUMMARY

This disclosure provides an information transmission method and an apparatus, to resolve a problem of how to reduce frequent positioning and trajectory data reporting performed by a terminal device.

According to a first aspect, this disclosure provides an information transmission method. The method is performed by an access network device or a module in the access network device. An example in which the access network device is an execution body is used herein for description. The method includes: The access network device receives first indication information, where the first indication information indicates that a trajectory of a first terminal device matches a trajectory of a second terminal device; and sends second indication information to the first terminal device, where the second indication information indicates to change a trajectory information reporting periodicity of the first terminal device from a first periodicity to a second periodicity, or the second indication information indicates to suspend trajectory information reporting. The second periodicity is greater than the first periodicity.

The foregoing method is implemented, so that the access network device determines, based on the first indication information, that the trajectory of the first terminal device matches the trajectory of the second terminal device. In this case, the access network device may indicate, by using the second indication information, the first terminal device to increase the trajectory information reporting periodicity or suspend the trajectory information reporting, to reduce a quantity of trajectory information reporting times, avoid frequent trajectory information reporting performed by the first terminal device, save electric energy of the first terminal device, and reduce air interface resource occupation.

In a possible implementation, the first periodicity is the trajectory information reporting periodicity of the first terminal device before the first indication information is sent.

In a possible implementation, receiving the first indication information includes: receiving the first indication information from the first terminal device. Optionally, the first indication information specifically indicates second identification information of the second terminal device.

The second identification information is indicated by using the first indication information, so that the access network device can accurately determine, by using fewer signaling overheads, a terminal device whose trajectory matches the trajectory of the first terminal device.

In a possible implementation, the second identification information includes at least one of a second cell identifier of the second terminal device and a second cell radio network temporary identifier of the second terminal device. The second cell identifier may be understood as an identifier of a cell in which the second terminal device is located. The second cell radio network temporary identifier may be understood as a radio network temporary identifier of the second terminal device.

In a possible implementation, the first indication information indicates that a trajectory of one or more terminal devices matches the trajectory of the second terminal device, and the one or more terminal devices include the first terminal device.

A plurality of terminal devices are indicated by using the first indication information, to reduce signaling overheads and improve system resource utilization.

In a possible implementation, receiving the first indication information includes: receiving the first indication information from the second terminal device, where the first indication information specifically indicates identification information of the one or more terminal devices.

In a possible implementation, the method further includes: determining trajectory information of the first terminal device based on trajectory information of the second terminal device.

According to this method, when the trajectory of the first terminal device matches the trajectory of the second terminal device, the trajectory information of the first terminal device can be accurately determined without obtaining the trajectory information of the first terminal device.

In a possible implementation, trajectory information of the one or more terminal devices is determined based on the trajectory information of the second terminal device.

According to this method, when the trajectory of the one or more terminal devices matches the trajectory of the second terminal device, the trajectory information of the one or more terminal devices can be accurately determined without obtaining the trajectory information of the one or more terminal devices.

In a possible implementation, the method further includes: receiving third indication information, where the third indication information indicates that the trajectory of the first terminal device no longer matches the trajectory of the second terminal device.

In a possible implementation, the third indication information is from the first terminal device or the second terminal device.

In a possible implementation, the third indication information specifically indicates that the trajectory of the first terminal device no longer matches the trajectory of the second terminal device, indicates to delete the first terminal device from a device list, or indicates an updated device list, where the updated device list does not include the first terminal device.

In a possible implementation, fourth indication information is sent to the first terminal device, where the fourth indication information indicates to change the trajectory information reporting periodicity of the first terminal device from the second periodicity to a third periodicity, or the fourth indication information indicates the first terminal device to enable the trajectory information reporting. The third periodicity is less than the second periodicity.

According to this method, when the trajectory of the first terminal device does not match the trajectory of the second terminal device, the trajectory information of the first terminal device may be obtained in time by using the fourth indication information.

According to a second aspect, this disclosure provides an information transmission method. The method is performed by a terminal device or a module in the terminal device. An example in which a first terminal device is an execution body is used herein for description. The method includes: The first terminal device obtains second trajectory information of a second terminal device; sends first indication information if the second trajectory information matches first trajectory information of the first terminal device, where the first indication information indicates that a trajectory of the first terminal device matches a trajectory of the second terminal device; and determines to change a trajectory information reporting periodicity to a second periodicity or suspends trajectory information reporting, where the second periodicity is greater than a first periodicity, and the first periodicity is the trajectory information reporting periodicity before the first indication information is sent.

The foregoing method is implemented, so that the first terminal device determines that the trajectory of the first terminal device matches the trajectory of the second terminal device, and may increase the trajectory information reporting periodicity, to reduce a quantity of trajectory information reporting times, avoid frequent trajectory information reporting performed by the first terminal device, save electric energy of the first terminal device, and reduce air interface resource occupation.

In a possible implementation, determining to change the trajectory information reporting periodicity to the second periodicity or suspending the trajectory information reporting includes: receiving second indication information from an access network device, where the second indication information indicates to change the trajectory information reporting periodicity of the first terminal device to the second periodicity, or the second indication information indicates to suspend the trajectory information reporting.

In a possible implementation, sending the first indication information includes: sending the first indication information to the access network device, where the first indication information specifically indicates second identification information of the second terminal device.

In a possible implementation, the second identification information includes at least one of a second cell identifier of the second terminal device and a second cell radio network temporary identifier of the second terminal device.

In a possible implementation, sending the first indication information includes: sending the first indication information to the second terminal device, where the first indication information specifically indicates first identification information of the first terminal device.

In a possible implementation, the first identification information includes at least one of a first cell identifier of the first terminal device and a first cell radio network temporary identifier of the first terminal device.

In a possible implementation, obtaining the second trajectory information of the second terminal device includes: obtaining the second trajectory information of the second terminal device over a sidelink.

In a possible implementation, the second trajectory information includes one or more pieces of second positioning information, and the second positioning information includes at least one of the following information: time information corresponding to the second positioning information, speed information of the second terminal device, movement direction information of the second terminal device, location information of the second terminal device, the second cell identifier of the second terminal device, or the second cell radio network temporary identifier of the second terminal device.

In a possible implementation, the first trajectory information includes one or more pieces of first positioning information, and the first positioning information includes at least one of the following information: time information corresponding to the first positioning information, speed information of the first terminal device, movement direction information of the first terminal device, or location information of the first terminal device.

In a possible implementation, the method further includes: sending third indication information if the second trajectory information no longer matches the first trajectory information of the first terminal device, where the third indication information indicates that the trajectory of the first terminal device no longer matches the trajectory of the second terminal device.

In a possible implementation, the method further includes: receiving fourth indication information from the access network device, where the fourth indication information indicates to change the trajectory information reporting periodicity to a third periodicity, and the third periodicity is less than the second periodicity.

According to a third aspect, this disclosure provides an information transmission method. The method is performed by a terminal device or a module in the terminal device. An example in which a second terminal device is an execution body is used herein for description. The method includes: The second terminal device determines first indication information; and sends the first indication information to an access network device, where the first indication information indicates that a trajectory of a first terminal device matches a trajectory of the second terminal device.

In a possible implementation, before the first indication information is determined, the method further includes: receiving fifth indication information from the first terminal device, where the fifth indication information indicates that the trajectory of the first terminal device matches the trajectory of the second terminal device.

In a possible implementation, the first indication information indicates that a trajectory of one or more terminal devices matches the trajectory of the second terminal device, and the one or more terminal devices include the first terminal device.

In a possible implementation, the method further includes: adding the first terminal device to a first list based on the first indication information.

In a possible implementation, the method further includes: sending second trajectory information of the second terminal device over a sidelink.

In a possible implementation, the second trajectory information includes one or more pieces of second positioning information, and the second positioning information includes at least one of the following information: time information corresponding to the second positioning information, speed information of the second terminal device, movement direction information of the second terminal device, location information of the second terminal device, a second cell identifier of the second terminal device, or a second cell radio network temporary identifier of the second terminal device.

In a possible implementation, the method further includes: receiving third indication information, where the third indication information indicates that the trajectory of the first terminal device no longer matches the trajectory of the second terminal device.

In a possible implementation, the method further includes: sending the third indication information to the access network device; or sending sixth indication information to the access network device, where the sixth indication information indicates that a trajectory of at least one terminal device no longer matches the trajectory of the second terminal device, and the at least one terminal device includes the first terminal device.

According to a fourth aspect, this application provides an information transmission method. The method is performed by an access network device or a module in the access network device. An example in which a first access network device is an execution body is used herein for description. The method includes: The first access network device obtains first trajectory information of a first terminal device, and obtains second trajectory information of a second terminal device; and sends second indication information to the first terminal device if the second trajectory information matches the first trajectory information, where the second indication information indicates to change a trajectory information reporting periodicity to a second periodicity, the second periodicity is greater than a first periodicity, and the first periodicity is the trajectory information reporting periodicity before first indication information is sent.

The foregoing method is implemented, so that the first access network device determines that a trajectory of the first terminal device matches a trajectory of the second terminal device. In this case, the first access network device may indicate, by using the second indication information, the first terminal device to increase the trajectory information reporting periodicity, to reduce a quantity of trajectory information reporting times, avoid frequent trajectory information reporting performed by the first terminal device, save electric energy of the first terminal device, and reduce air interface resource occupation.

In a possible implementation, the method further includes: adding the first terminal device to a first list, where the first list includes one or more terminal devices, and a trajectory of the one or more terminal devices matches the trajectory of the second terminal device.

In a possible implementation, the method further includes: determining trajectory information of the first terminal device based on trajectory information of the second terminal device.

In a possible implementation, the method further includes: sending fourth indication information to the first terminal device if the first trajectory information no longer matches the second trajectory information, where the fourth indication information indicates to change the trajectory information reporting periodicity to a third periodicity, and the third periodicity is less than the second periodicity.

In a possible implementation, the method further includes: deleting the first terminal device from the first list, where the first list includes the one or more terminal devices, and the trajectory of the one or more terminal devices matches the trajectory of the second terminal device.

In a possible implementation, the method further includes: if it is determined that the second terminal device is handed over to a cell managed by a second access network device, sending seventh indication information to the second access network device, where the seventh indication information indicates that the trajectory of the one or more terminal devices matches the trajectory of the second terminal device, and the one or more terminal devices include the first terminal device.

In a possible implementation, a target cell to which the one or more terminal devices are handed over and a target cell to which the second terminal device is handed over belong to a same access network device.

In a possible implementation, the first trajectory information includes one or more pieces of first positioning information, and the first positioning information includes at least one of the following information: time information corresponding to the first positioning information, speed information of the first terminal device, movement direction information of the first terminal device, or location information of the first terminal device.

In a possible implementation, the second trajectory information includes one or more pieces of second positioning information, and the second positioning information includes at least one of the following information: time information corresponding to the second positioning information, speed information of the second terminal device, movement direction information of the second terminal device, or location information of the second terminal device.

According to a fifth aspect, this application further provides a communication apparatus. The communication apparatus can implement any method or any implementation provided in the first aspect or the fourth aspect. The communication apparatus may be implemented by hardware, may be implemented by software, or may be implemented by hardware executing corresponding software. The hardware or software includes one or more units or modules corresponding to the foregoing functions.

In a possible implementation, the communication apparatus includes a processor. The processor is configured to support the communication apparatus in performing the method shown in the first aspect or the fourth aspect. The communication apparatus may further include a memory. The memory may be coupled to the processor, and the memory stores program instructions and data that are necessary for the communication apparatus. Optionally, the communication apparatus further includes an interface circuit, and the interface circuit is configured to support the communication apparatus in communicating with another communication apparatus.

In a possible implementation, a structure of the communication apparatus includes a processing unit and a communication unit. These units may perform corresponding functions in the foregoing method examples. For details, refer to descriptions in the first aspect or the fourth aspect. Details are not described herein again.

According to a sixth aspect, this application further provides a communication apparatus. The communication apparatus can implement any method or any implementation provided in the second aspect or the third aspect. The communication apparatus may be implemented by hardware, may be implemented by software, or may be implemented by hardware executing corresponding software. The hardware or software includes one or more units or modules corresponding to the foregoing functions.

In a possible implementation, the communication apparatus includes a processor. The processor is configured to support the communication apparatus in performing the method shown in the second aspect or the third aspect. The communication apparatus may further include a memory. The memory may be coupled to the processor, and the memory stores program instructions and data that are necessary for the communication apparatus. Optionally, the communication apparatus further includes an interface circuit, and the interface circuit is configured to support the communication apparatus in communicating with another communication apparatus.

In a possible implementation, a structure of the communication apparatus includes a processing unit and a communication unit. These units may perform corresponding functions in the foregoing method examples. For details, refer to descriptions in the method provided in the second aspect or the third aspect. Details are not described herein again.

According to a seventh aspect, a communication apparatus is provided, including a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to execute a computer program or instructions stored in a memory, to implement the method in any possible implementation of the first aspect or the fourth aspect, or implement the method in any possible implementation of the second aspect or the third aspect. Optionally, the apparatus further includes the memory, and the memory stores the computer program or the instructions.

According to an eighth aspect, a computer-readable storage medium is provided. The computer-readable storage medium stores a computer program or instructions, and when the computer program or the instructions are run on a computer, the computer is enabled to implement the method in any possible implementation of the first aspect or the fourth aspect, or the computer is enabled to implement the method in any possible implementation of the second aspect or the third aspect.

According to a ninth aspect, a computer program product including computer-readable instructions is provided. When the computer-readable instructions are run on a computer, the computer is enabled to implement the method in any possible implementation of the first aspect or the fourth aspect, or the computer is enabled to implement the method in any possible implementation of the second aspect or the third aspect.

According to a tenth aspect, a chip is provided. The chip includes a processor, and may further include a memory. The processor is coupled to the memory, and is configured to execute a computer program or instructions stored in the memory, to enable the chip to implement the method in any possible implementation of the first aspect or the fourth aspect, or enable the chip to implement the method in any possible implementation of the second aspect or the third aspect.

According to an eleventh aspect, a communication system is provided. The system includes an apparatus (such as an access network device) for implementing the method in the first aspect, an apparatus (such as a first terminal device) for implementing the method in the second aspect, and an apparatus (such as a second terminal device) for implementing the method in the third aspect; or the system includes an apparatus (such as an access network device) for implementing the method in the fourth aspect, an apparatus (such as a first terminal device) for implementing the method in the second aspect, and an apparatus (such as a second terminal device) for implementing the method in the third aspect.

DETAILED DESCRIPTION OF ILLUSTRATIVE EMBODIMENTS

Figure 1:
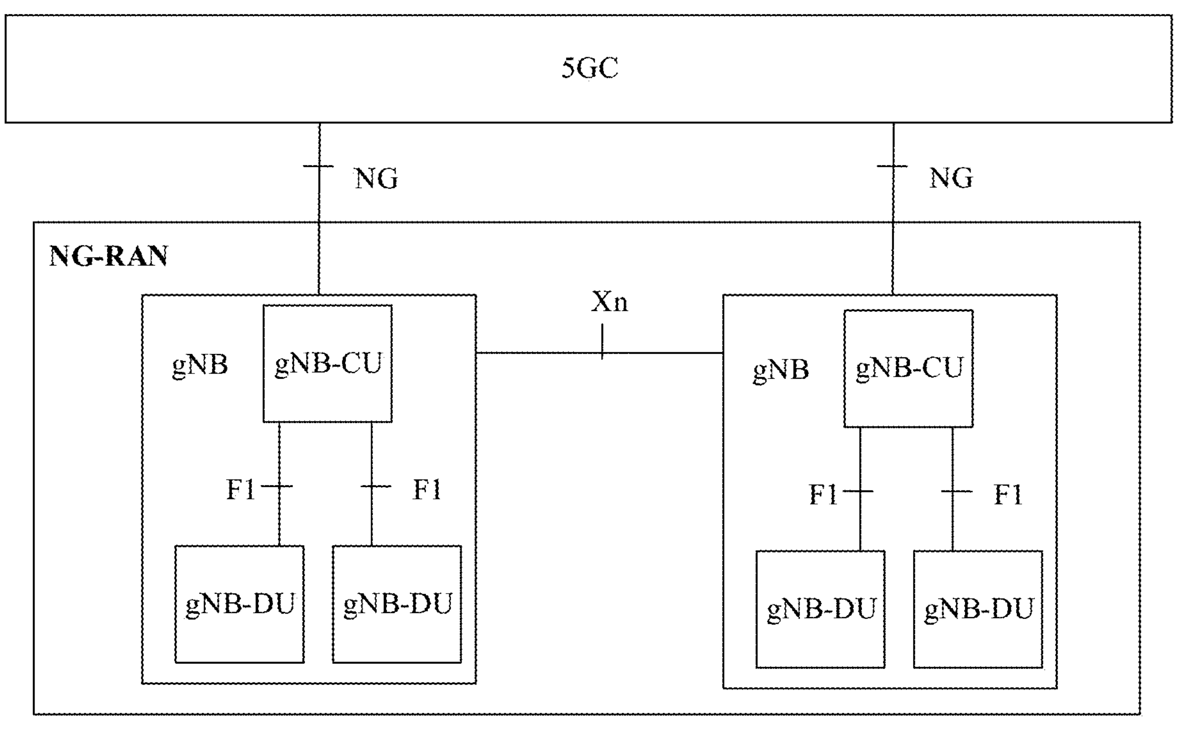
FIG. 1 is a diagram of a network architecture applicable to this disclosure.

The following describes this disclosure in detail with reference to the accompanying drawings of the specification.

This disclosure may be applied to various mobile communication systems, for example, a 5G new radio (NR) system, a long term evolution (LTE) system, a future communication system, and other communication systems. This is not specifically limited herein.

In this disclosure, a terminal device may also be referred to as user equipment (UE). One type of possible UE is vehicle-user equipment (V-UE). The UE is a device having a wireless transceiver function or a chip that can be disposed in the device, and may support at least one mobile communication system. In actual application, the terminal device in embodiments of this disclosure may be a mobile phone, a tablet computer (e.g., a Pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in embodiments of this disclosure. The terminal device in this disclosure may be widely used in communication in various scenarios, including but not limited to at least one of the following scenarios: enhanced mobile broadband (eMBB), ultra-reliable low-latency communication (URLLC), device-to-device (D2D), vehicle to everything (V2X), machine-type communication (MTC), massive machine-type communication (mMTC), internet of things (IoT), virtual reality, augmented reality, industrial control, autonomous driving, telemedicine, a smart grid, smart furniture, a smart office, a smart wearable, smart transportation, a smart city, or the like. A specific technology and a specific device form used by a terminal are not limited in this disclosure.

In this disclosure, V2X includes vehicle to vehicle (V2V), vehicle to pedestrian (V2P), vehicle to infrastructure (V2I), and vehicle to network (V2N). In a possible implementation, direct communication between terminal devices may be used as a part of a V2X work item. The direct communication between the terminal devices is also referred to as sidelink communication. An NR sidelink supports three basic transmission scenarios: unicast, groupcast, and broadcast. Unicast sidelink transmission is for a specific receiving terminal device; groupcast sidelink transmission is for a group of specific receiving terminal devices; and broadcast sidelink transmission is for any terminal device within a transmission range.

In this disclosure, an access network device may also be referred to as a radio access network (RAN) device, and may be a radio access device or a base station in various standards. For example, the access network device may be a base station, a NodeB, an evolved NodeB (eNodeB or eNB), a transmission reception point (TRP), a next generation NodeB (gNB) in a 5th generation (5G) mobile communication system, an access network device or a related module in the access network device in an open radio access network (O-RAN or open RAN), a next generation NodeB in a 6th generation (6G) mobile communication system, a base station in a future mobile communication system, or an access node in a wireless fidelity (Wi-Fi) system; or may be a module or a unit that implements a part of functions of the foregoing base stations, for example, may be a central unit (CU), a distributed unit (DU), a central unit control plane (CU-CP) module, or a central unit user plane (CU-UP) module. The access network device may be a macro base station, may be a micro base station or an indoor station, or may be a relay node, a donor node, or the like. A specific technology and a specific device form used by the access network device are not limited in this disclosure.

FIG. 1 is a diagram of a network architecture applicable to this disclosure. In FIG. 1, a 5G core network (CN) is connected to a next generation radio access network (NG-RAN) through an NG interface. The NG-RAN includes one or more gNBs, and the gNBs are connected to each other through an Xn interface. Optionally, the one or more gNBs in the NG-RAN may use a distributed architecture. To be specific, a CU and a DU of the gNB are separated. The gNB includes one or more distributed units (DU) and one central unit (CU). The CU and the DU are connected through an F1 interface. In actual network deployment, the DU and the CU may be centrally deployed at a same geographical location, or may be separately deployed at different geographical locations. Optionally, the one or more gNBs in the NG-RAN may be an integrated gNB. To be specific, the CU and the DU of the gNB are not separated.

In this disclosure, functions of the CU and the DU may be divided based on a protocol stack. In a possible manner, a radio resource control (RRC) layer, a service data adaptation protocol (SDAP) layer, and a packet data convergence protocol (PDCP) layer may be deployed on the CU, and a remaining radio link control (RLC) layer, media access control (MAC) layer, and physical (PHY) layer are deployed on the DU. The CU and the DU are connected through the F1 interface. The CU may represent the gNB to be connected to a core network through the NG interface. The CU may represent the gNB to be connected to another gNB through the Xn interface. The CU may represent the gNB to perform a dual connectivity operation by connecting to another eNB (e.g., an evolved NodeB) through an X2 interface. It may be understood that division of the foregoing functions is merely an example, and does not constitute a limitation on the CU and the DU. In other words, there may be another function division manner between the CU and the DU. Details are not described herein in this disclosure.

Further, functions of the CU may be implemented by one entity, or may be implemented by different entities. For example, the functions of the CU may be further divided. For example, a control plane (CP) is separated from a user plane (UP). To be specific, the control plane (CU-CP) of the CU is separated from the user plane (CU-UP) of the CU. For example, the CU-CP and the CU-UP may be implemented by different function entities. The CU-CP and the CU-UP may be coupled to the DU to jointly implement functions of the base station. In a possible manner, the CU-CP is responsible for a control plane function, and the control plane function mainly includes an RRC function and a PDCP (namely, PDCP-C) function corresponding to the control plane. The PDCP-C is mainly responsible for encryption and decryption, integrity protection, data transmission, and the like of control plane data. The CU-UP is responsible for a user plane function, and the user plane function mainly includes an SDAP function and a PDCP (namely, PDCP-U) function corresponding to the user plane. The SDAP is mainly responsible for processing data of the core network and mapping a data flow to a bearer. The PDCP-U is mainly responsible for encryption and decryption, integrity protection, header compression, sequence number maintenance, data transmission, and the like of a data plane. The CU-CP and the CU-UP are connected through an E1 interface. The CU-CP may represent the gNB to be connected to the core network through the NG interface. The CU-CP is connected to the DU by using an F1-C (control plane). The CU-UP is connected to the DU by using an F1-U (user plane). Certainly, another possible implementation is that the PDCP-C is also on the CU-UP.

Optionally, a radio unit (RU) of the DU may be disposed remotely. The RU may have a radio frequency function. The DU and the RU may be divided at a physical layer (PHY). For example, the DU may implement high layer functions of the PHY layer, and the RU may implement low layer functions of the PHY layer. When used for sending, functions of the PHY layer may include at least one of the following: cyclic redundancy check (CRC) code adding, channel coding, rate matching, scrambling, modulation, layer mapping, precoding, resource mapping, physical antenna mapping, or radio frequency sending functions. When used for receiving, the functions of the PHY layer may include at least one of the following: CRC check, channel decoding, rate de-matching, descrambling, demodulation, de-layer mapping, channel detection, resource de-mapping, physical antenna de-mapping, or radio frequency receiving functions. The high layer functions of the PHY layer may include a part of the functions of the PHY layer. For example, the part of the functions are closer to a MAC layer. The low layer functions of the PHY layer may include another part of the functions of the PHY layer. For example, the another part of the functions are closer to the radio frequency function. For example, the high layer functions of the PHY layer may include CRC code adding, channel coding, rate matching, scrambling, modulation, and layer mapping, and the low layer functions of the PHY layer may include precoding, resource mapping, physical antenna mapping, and radio frequency sending functions. Alternatively, the high layer functions of the PHY layer may include CRC code adding, channel coding, rate matching, scrambling, modulation, layer mapping, and precoding, and the low layer functions of the PHY layer may include resource mapping, physical antenna mapping, and radio frequency sending functions. For example, the high layer functions of the PHY layer may include CRC check, channel decoding, rate de-matching, decoding, demodulation, and de-layer mapping, and the low layer functions of the PHY layer may include channel detection, resource de-mapping, physical antenna de-mapping, and radio frequency receiving functions. Alternatively, the high layer functions of the PHY layer may include CRC check, channel decoding, rate de-matching, decoding, demodulation, de-layer mapping, and channel detection, and the low layer functions of the PHY layer may include resource de-mapping, physical antenna de-mapping, and radio frequency receiving functions.

Optionally, any one of the DU, the CU, the CU-CP, the CU-UP, and the RU may be a software module, a hardware structure, or a software module and a hardware structure. This is not limited. Existence forms of different entities may be different, and are not limited. For example, the DU, the CU, the CU-CP, and the CU-UP are software modules, and the RU is a hardware structure. These modules and methods performed by the modules also fall within the protection scope of this disclosure.

Figure 2:
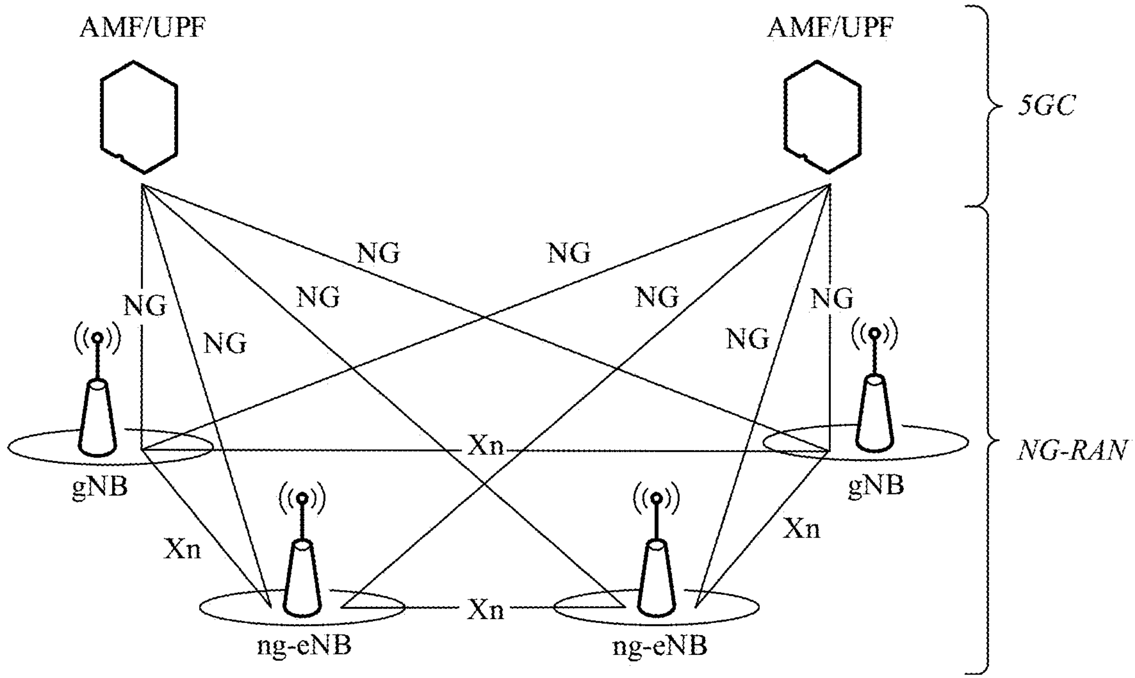
FIG. 2 is a diagram of an overall architecture of an NG-RAN according to this disclosure.

FIG. 2 is a diagram of an overall architecture of an NG-RAN according to this disclosure. The architecture includes two types of base stations: a gNB in 5G and a next generation evolved NodeB (ng-eNB) in a 4G system. To simplify the descriptions, the gNB and the ng-eNB are uniformly represented by the gNB in the following. gNBs are connected to each other through an Xn interface. The gNB is connected to a 5G core network (5G core, 5GC) through an NG interface. The 5GC may further include network elements such as an access and mobility management function (AMF) and a user plane function (UPF).

Figure 3:
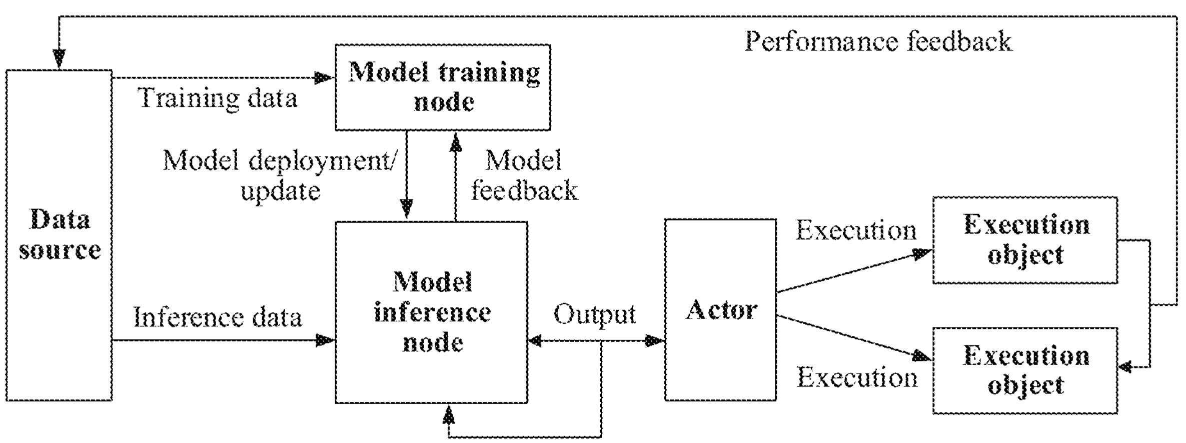
FIG. 3 is an example diagram of an application framework of AI in a wireless communication system.

In a possible implementation, an artificial intelligence (AI) technology may be introduced into a wireless communication system, to implement an intelligent network. The artificial intelligence is a technology that simulates a human brain to perform complex computing. With improvement of data storage and computing capabilities, AI is used more widely. For example, the AI is used in NR to intelligently collect and analyze data to improve network performance and user experience. FIG. 3 is an example diagram of an application framework of AI in a wireless communication system. In FIG. 3, a data source is used to store training data and inference data. A model training node analyzes or trains the training data provided by the data source to obtain an AI model, and deploys the AI model on a model inference node. The AI model represents a mapping relationship between an input and an output of a model. The AI model is obtained through learning by using the model training node. This is equivalent to that the model training node obtains the mapping relationship between the input and the output of the model through learning by using the training data. The model inference node uses the AI model to perform inference based on the inference data provided by the data source, to obtain an inference result. The method may be further described as follows: The model inference node inputs the inference data to the AI model, and obtains the output by using the AI model, where the output is the inference result. The inference result may indicate a configuration parameter used (e.g., executed) by an execution object, and/or an operation performed by an execution object. The inference result may be uniformly planned by an actor entity, and sent to one or more execution objects (for example, a network element) for execution. Optionally, the model training node may further update an AI model that has been deployed on the model inference node. The model inference node may feed back related information of the deployed model to the model training node, so that the model training node performs optimization, updating, or the like on the deployed AI model. Optionally, the execution object may feed back a network parameter collected by the execution object to the data source. This process may be referred to as performance feedback, and the fed-back network parameter may be used as the training data or the inference data.

In this disclosure, the application framework shown in FIG. 3 may be deployed on the gNB, the gNB-CU, or the gNB-DU in FIG. 1 or FIG. 2. Alternatively, the application framework shown in FIG. 3 may be deployed on another device, for example, may be deployed on an operation, administration and maintenance (OAM) device, an access network intelligent controller (RIC) module, or the like in the access network device. This is not limited in this disclosure. An access network device in NR may support a plurality of AI-assisted application scenarios. These AI-assisted application scenarios may require some input data for analysis or training. For example, a mobility enhancement scenario is used as an example. The access network device needs a terminal device to periodically report trajectory information of the terminal device as the input data, to predict a target cell of the terminal. However, frequent trajectory information reporting performed by the terminal device causes a large amount of power consumption and air interface resource occupation. Therefore, this disclosure provides a method, to reduce the frequent trajectory information reporting performed by the terminal device, so that the power consumption and the air interface resource occupation are reduced.

It may be understood that trajectory information of the terminal device in this disclosure is trajectory information authorized by a user, and/or trajectory information obtained after sensitive information is filtered out.

In this disclosure, when “less than” or “greater than” is used for comparison, “less than” may also be replaced with “less than or equal to”, “greater than” may also be replaced with “greater than or equal to”. The reverse is also true.

In the examples of this disclosure, unless otherwise specified or there is a logic conflict, terms and/or descriptions in different examples are consistent and may be mutually referenced, and technical features in different examples may be combined, based on an internal logical relationship thereof, to form a new example.

It may be understood that various numbers in the examples of this disclosure are merely for distinguishing for ease of description, and are not intended to limit the scope of the examples of this disclosure. Sequence numbers of the foregoing processes do not mean execution sequences, and the execution sequences of the processes should be determined based on functions and internal logic of the processes.

In addition, in this disclosure, the word “example” is used to represent giving an example, an illustration, or a description. Any embodiment or design scheme described as an “example” in this disclosure should not be explained as being more preferred or having more advantages than another embodiment or design scheme. Exactly, the word "example" is used to present a concept in a specific manner.

A network architecture and a service scenario that are described in this disclosure are intended to describe the technical solutions in this disclosure more clearly, but do not constitute a limitation on the technical solutions provided in this disclosure. A person of ordinary skill in the art may know that with evolution of the network architecture and emergence of a new service scenario, the technical solutions provided in this disclosure are also applicable to similar technical problems.

This disclosure is described by using interaction between a first terminal device, a second terminal device, and an access network device as an example. The first terminal device may be a mobile terminal such as a mobile phone, the second terminal device may be V-UE such as an intelligent vehicle, and the access network device may be a gNB in 5G (or a module implementing a function of the gNB, such as a CU, a CU-CP, a CU-UP, and/or a DU), an access network device in an O-RAN (or a module implementing a function of the access network device, for example, a CU, a CU-CP, a CU-UP, and/or a DU in the O-RAN), or the like. Optionally, the first terminal device and the second terminal device may be other types of terminal devices. This is not limited.

In a mobile communication system, for example, in 5G, the access network device may support a plurality of cases assisted by artificial intelligence, for example, mobility enhancement, load balancing, and network energy saving. In all the foregoing three cases, the terminal device needs to report the trajectory information as an input of an artificial intelligence prediction model. The mobility enhancement scenario is used as an example. The access network device may indicate a terminal device that requires a mobility enhancement service to periodically report trajectory information of the terminal device, predict an artificial intelligence future trajectory based on historical trajectory information and currently reported trajectory information, and infer a cell handover solution based on information such as the predicted trajectory, a measurement report, and a cell load status. Optionally, when implementing an artificial intelligence technology, the access network device may introduce an AI module into at least one of the access network device, the CU, the CU-CP, the CU-UP, or the DU, to implement the artificial intelligence technology.

However, frequent positioning and trajectory data reporting performed by the terminal device cause a large amount of power consumption and air interface resource occupation.

Figure 4:
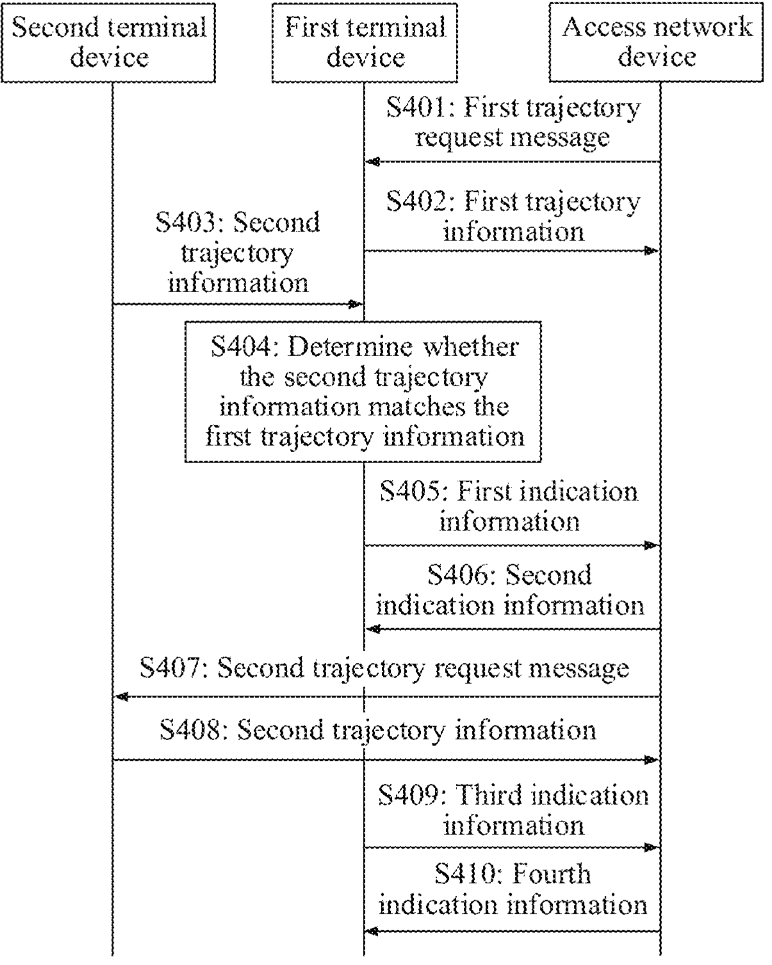
FIG. 4 is a schematic flowchart of an information transmission method according to this disclosure.

FIG. 4 is a schematic flowchart of an information transmission method according to this disclosure.

In the method procedure, a first terminal device may obtain trajectory information of a second terminal device, and determine whether the trajectory information of the second terminal device matches trajectory information of the first terminal device. If the trajectory information of the second terminal device matches the trajectory information of the first terminal device, the first terminal device may indicate, to an access network device, that a trajectory of the first terminal device matches a trajectory of the second terminal device. The access network device may determine the trajectory information of the first terminal device based on the trajectory information of the second terminal device. In this case, the access network device may indicate the first terminal device to increase a trajectory information reporting periodicity to reduce a quantity of trajectory information reporting times, or indicate the first terminal device to suspend trajectory information reporting. A specific procedure includes the following steps.

S401: The access network device sends a first trajectory request message to the first terminal device.

The first trajectory request message may indicate a trajectory information reporting periodicity. For ease of description, the trajectory information reporting periodicity in S401 may be briefly referred to as a first periodicity.

Optionally, the first trajectory request message may further include information such as a positioning periodicity. The positioning periodicity is a periodicity in which the first terminal device performs positioning.

In this disclosure, the trajectory information reported by the first terminal device may be referred to as first trajectory information, and the first trajectory information may be a set of one or more pieces of first positioning information of the first terminal device. The first trajectory information may include one or more pieces of first positioning information in the trajectory information reporting periodicity. For example, the first terminal device performs positioning for 100 times in one trajectory information reporting periodicity, and obtains 100 pieces of first positioning information. In this case, the first trajectory information reported by the first terminal device in one trajectory information reporting periodicity includes 100 pieces of positioning information.

The first positioning information of the first terminal device may include at least one of the following information:

- time information corresponding to the first positioning information, speed information of the first terminal device, movement direction information of the first terminal device, or location information of the first terminal device. The location information may include a longitude and a latitude of the first terminal device.

For example, if the positioning periodicity is 10 milliseconds, and the trajectory information reporting periodicity is 1 second, the first terminal device performs positioning once every 10 milliseconds, to obtain one piece of first positioning information. For example, one piece of first positioning information may include: time information of current positioning, for example, the time information is 10:10:10:200 in 2021; speed information of the first terminal device during positioning, for example, the speed information is 1.2 meters per second; movement direction information of the first terminal device during positioning, for example, the movement direction information is a due west direction; or location information of the first terminal device during positioning, for example, the location information is longitude and latitude coordinates of the first terminal device. The first terminal device reports the first trajectory information every second, and first trajectory information reported each time includes 100 pieces of first positioning information.

S402: The first terminal device reports the first trajectory information to the access network device.

The first terminal device may periodically report the first trajectory information to the access network device based on the first periodicity in the first trajectory request message. A specific reporting process is not limited in this disclosure, and details are not described herein.

S401 and S402 are optional operations. To be specific, before S403, the first terminal device may not start to report the first trajectory information to the access network device. Alternatively, S401 is optional. For example, the positioning periodicity and the first periodicity may be agreed on in a protocol, and do not need to be indicated by the access network device to the first terminal device by using signaling.

S403: The second terminal device sends second trajectory information.

Specifically, the second terminal device may periodically broadcast the second trajectory information over a sidelink. When broadcasting the second trajectory information over the sidelink, the second terminal device may broadcast the second trajectory information by using a sidelink resource through a PC5 interface.

The second terminal device may keep periodically broadcasting the second trajectory information over the sidelink, or may intermittently broadcast the second trajectory information. For example, in a possible implementation, the second terminal device may broadcast the second trajectory information of the second terminal device only when the second terminal device arrives near a specific location or is in a specific case, and does not broadcast the second trajectory information in another time period or in another case. For example, the second terminal device is an intelligent vehicle, and the second terminal device broadcasts the second trajectory information at a specified distance from a station (for example, within 200 meters from the station) in which the second terminal device needs to park. In another case, the second terminal device does not broadcast the second trajectory information. For another example, the second terminal device may broadcast the second trajectory information when moving in a specified route between two stations in which the second terminal device needs to park. The second terminal device does not broadcast the second trajectory information when moving in another route.

In another possible implementation, the second terminal device broadcasts the second trajectory information based on a periodicity T1 when arriving near a specific location. In another case, the second terminal device broadcasts the second trajectory information based on a periodicity T2 or does not broadcast the second trajectory information. T1 may be less than T2. For example, the second terminal device is an intelligent vehicle, and the second terminal device broadcasts the second trajectory information every 0.5 seconds within a specified distance from a station in which the second terminal device needs to park. In another case, the second terminal device broadcasts the second trajectory information every 5 seconds. For another example, the second terminal device may broadcast the second trajectory information every 0.5 seconds when moving in a specified route between two stations in which the second terminal device needs to park. The second terminal device broadcasts the second trajectory information every 5 seconds when moving in another route.

In another possible implementation, after a speed of the second terminal device exceeds a specified threshold (for example, 10 kilometers per hour (km/h)) and the second terminal device travels at the speed for more than a period of time (for example, 30 seconds), a broadcast periodicity of the second trajectory information may be increased, or a trajectory broadcasting function is disabled, that is, broadcasting of the second trajectory information is suspended.

According to the foregoing method, energy consumption caused by broadcasting the second trajectory information can be reduced, and sidelink resource occupation can also be reduced.

In this disclosure, the second trajectory information includes one or more pieces of second positioning information, and the second positioning information may include at least one of the following information: time information corresponding to the second positioning information, speed information of the second terminal device, movement direction information of the second terminal device, location information of the second terminal device, a second cell identifier of the second terminal device, or a second cell radio network temporary identifier (C-RNTI) of the second terminal device.

In this disclosure, the second trajectory information may be carried on a data radio bearer (DRB), or may be carried on a signaling radio bearer (SRB).

In this disclosure, a transmission resource used by the second terminal device to send the second trajectory information may be allocated by the access network device to the second terminal device, or may be obtained by the second terminal device through resource perception. For example, the access network device configures, for the second terminal device by using RRC signaling, a grant for a sidelink transmission resource, and the sidelink transmission resource includes at least one of the following: a periodicity, a time offset, a frequency offset, or the like. Alternatively, the second terminal device perceives an available sidelink transmission resource set, selects a resource for data transmission, and notifies another terminal device of resource reservation information. Specific content of a sidelink transmission resource allocation manner is not limited in this disclosure, and details are not described herein.

S404: The first terminal device obtains the second trajectory information of the second terminal device, and determines whether the second trajectory information matches the first trajectory information.

Figures 5, 6:
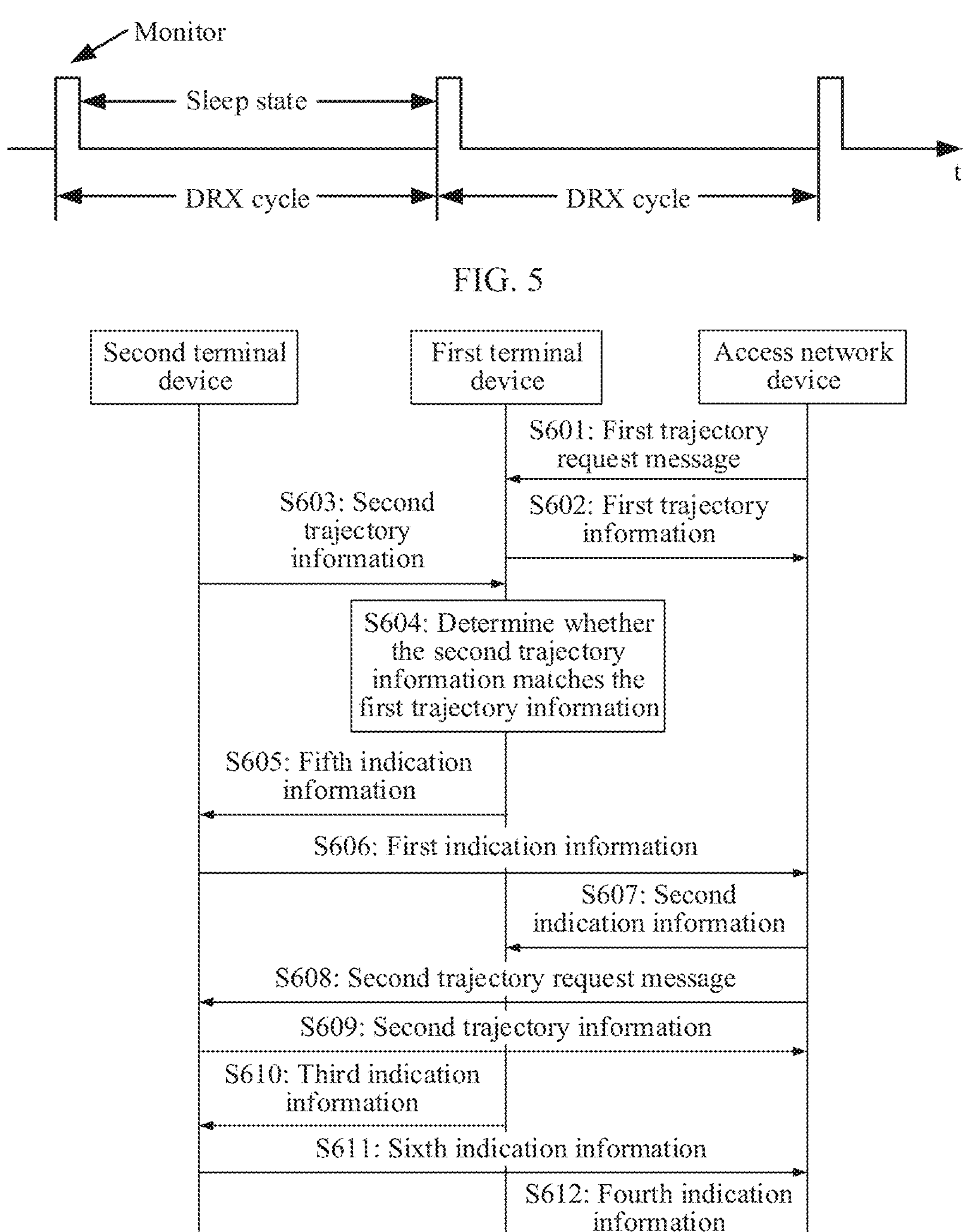
FIG. 5 is a diagram of a DRX cycle according to this disclosure.
FIG. 6 is a schematic flowchart of an information transmission method according to this disclosure.

If the second terminal device broadcasts the second trajectory information over the sidelink, the first terminal device may obtain the second trajectory information through monitoring. In a possible implementation, the first terminal device may perform monitoring in a discontinuous reception (DRX) mode, to reduce power consumption of the first terminal device. As shown in FIG. 5, a DRX cycle may include two parts: on duration and opportunity for DRX. Within time of “on duration”, the first terminal device is in an awake state, and the first terminal device may monitor presence of information broadcast by another terminal device; and within time of “opportunity for DRX”, the first terminal device is in a sleep mode (or a sleep state) and does not perform monitoring.

In another possible implementation, the first terminal device periodically determines whether a speed of the first terminal device is greater than a preset speed (for example, the preset speed is 10 km/h). For example, the first terminal device measures an average speed of every past Y (where Y is an integer or a decimal, for example, Y=3) seconds, and determines whether the measured speed is greater than the preset speed. If the measured speed is greater than the preset speed, the first terminal device determines that the first terminal device is in a non-pedestrian state, and starts to monitor broadcast information of the second terminal device. According to this method, energy consumption caused by monitoring the broadcast information by the first terminal device can be reduced.

In this disclosure, there may be a plurality of methods for specifically determining, by the first terminal device, whether the second trajectory information matches the first trajectory information. A specifically used matching method is not limited in this disclosure. For example, whether the second trajectory information matches the first trajectory information may be determined based on a trajectory similarity between the first trajectory information and the second trajectory information. In a possible implementation of determining the trajectory similarity, after trajectory data (e.g., including longitudes and latitudes) of the two terminals is normalized, a similarity between the longitudes and a similarity between the latitudes of the two terminals are separately calculated. When the similarity between the longitudes of the two terminal devices is less than or equal to a first threshold, and the similarity between the latitudes of the two terminal devices is less than or equal to a second threshold, it is considered that trajectory information of the two terminal devices matches. Specific values of the first threshold and the second threshold may be determined based on an actual situation. Methods for calculating the similarity include a Euclidean distance, a cosine similarity, a Pearson correlation coefficient, and the like, which are not listed one by one herein.

In this disclosure, whether the second trajectory information matches the first trajectory information may be alternatively determined in another manner. For example, the first terminal device determines, based on reference signal received power (RSRP) of a broadcast signal of the second terminal device, whether the second trajectory information matches the first trajectory information. For example, when the RSRP that is of the broadcast signal of the second terminal device and that is measured by the first terminal device is greater than or equal to a preset threshold, and duration exceeds a preset time threshold, it may be determined that the second trajectory information matches the first trajectory information.

S405: The first terminal device sends first indication information to the access network device if the second trajectory information of the second terminal device matches the first trajectory information of the first terminal device, and correspondingly, the access network device receives the first indication information.

The first indication information indicates that the trajectory of the first terminal device matches the trajectory of the second terminal device.

In a possible implementation, second trajectory information of the second terminal device within first duration may be matched with first trajectory information of the first terminal device within the first duration. The first duration may be a time length, or may be a time period. For example, when the first duration is a time length, the first duration may be, for example, 30 seconds, 60 seconds, or 2 minutes; or when the first duration is a time period, the first duration may be, for example, from 10:10:10 in 2021 to 10:12:10 in 2021. The first duration may be configured by the access network device, may be agreed on in a protocol, or may be autonomously determined by the first terminal device. This is not limited in this disclosure.

It should be noted that if the second trajectory information does not match the first trajectory information, the first terminal device does not need to send the first indication information to the access network device.

In a possible implementation, the first indication information further indicates second identification information of the second terminal device. The second identification information may include at least one of the cell identifier of a second cell in which the second terminal device is located and the second C-RNTI of the second terminal device. The second C-RNTI of the second terminal device may also be briefly referred to as a C-RNTI of the second terminal device.

In another possible implementation, the first indication information and the second identification information are same information. Specifically, the first indication information may specifically indicate the second identification information of the second terminal device. When the first indication information specifically indicates the second identification information, and the access network device obtains the second identification information, the access network device may determine that the trajectory of the first terminal device matches the trajectory of the second terminal device. In this implementation, it is equivalent to that the first indication information implicitly indicates that the trajectory of the first terminal device matches the trajectory of the second terminal device.

In this disclosure, the second identification information may not be indicated by using the first indication information, and the second identification information and the first indication information are carried by using two independent information elements.

In this disclosure, when the second trajectory information matches the first trajectory information, the first terminal device may further change a monitoring periodicity from a first monitoring periodicity to a second monitoring periodicity. The second monitoring periodicity is greater than the first monitoring periodicity. The first monitoring periodicity and the second monitoring periodicity may be configured by the access network device, may be agreed on in a protocol, or may be autonomously determined by the first terminal device. This is not limited in this disclosure.

Optionally, in S406, the access network device sends second indication information to the first terminal device, and correspondingly, the first terminal device receives the second indication information from the access network device.

The second indication information indicates to change the trajectory information reporting periodicity of the first terminal device to the second periodicity, or the second indication information indicates the first terminal device to suspend the trajectory information reporting. The second periodicity is greater than the first periodicity, and the first periodicity is the trajectory information reporting periodicity before the first indication information is sent, or the first periodicity is a pre-agreed trajectory information reporting periodicity.

For example, the first periodicity is T1. When receiving the first indication information, the access network device may change the first periodicity to T2, where $T1<T2\leq\infty$. In this way, the first terminal device can reduce frequency of reporting the trajectory information, to reduce energy consumption of the first terminal device and radio resource occupation.

In this disclosure, in an implementation, when the second indication information indicates to suspend the trajectory information reporting, the first terminal device may start a timer when receiving the second indication information. Timing duration of the timer may be preconfigured in a protocol, or may be configured by the access network device, or may be autonomously set by the first terminal device. When the timer expires, the first terminal device reports the trajectory information to the access network device.

In another implementation, when the second indication information indicates to suspend the trajectory information reporting, the first terminal device may wait for an indication of the access network device, and report the trajectory information when the access network device re-indicates the first terminal device to report the trajectory information.

In this disclosure, the access network device may manage one or more terminal devices whose trajectories match the trajectory of the second terminal device. For example, the access network device may create a device list. In a possible implementation, the device list is shown in Table 1.

TABLE 1

| V-UE 1 | V-UE 2 | V-UE 3 |
|---|---|---|
| UE 1 | UE 6 | UE 11 |
| UE 2 | UE 7 | UE 12 |
| UE 3 | UE 8 | UE 13 |
| UE 4 | UE 9 | UE 14 |
| UE 5 | UE 10 | UE 15 |

In Table 1, three second terminal devices are included, and are respectively the V-UE 1, the V-UE 2, and the V-UE 3.

The UE 1 to the UE 5 are terminal devices whose trajectories match a trajectory of the V-UE 1, the UE 6 to the UE 10 are terminal devices whose trajectories match a trajectory of the V-UE 2, and the UE 11 to the UE 15 are terminal devices whose trajectories match a trajectory of the V-UE 3.

It is assumed that the access network device receives first indication information of the UE 16, and the first indication information indicates that a trajectory of the UE 16 matches the trajectory of the V-UE 1. In this case, the access network device may add the UE 16 to a column corresponding to the V-UE 1 in the list.

It is assumed that the access network device determines that a trajectory of the UE 5 no longer matches the trajectory of the V-UE 1. In this case, the access network device may delete the UE 5 from Table 1.

The foregoing is merely an example. The access network device may manage, in another manner, the one or more terminal devices whose trajectories match the trajectory of the second terminal device. This is not limited in this disclosure.

In this disclosure, when sending the second indication information to the first terminal device, the access network device may further indicate the second terminal device to report the trajectory information, to determine the trajectory information of the first terminal device based on the trajectory information of the second terminal device.

In this disclosure, if the access network device does not send the second indication information to the first terminal device, and when the first terminal device determines that the second trajectory information of the second terminal device matches the first trajectory information of the first terminal device, the first terminal device may actively change the trajectory information reporting periodicity of the first terminal device to the second periodicity, or suspend the trajectory information reporting when not receiving the second indication information.

S407: The access network device sends a second trajectory request message to the second terminal device, where the second trajectory request message indicates the second terminal device to report the second trajectory information of the second terminal device.

The second trajectory request message may include a trajectory information reporting periodicity configured for the second terminal device.

Optionally, the second trajectory request message may further indicate one or more of a positioning periodicity, reporting speed information, trip planning information, predicted trajectory information, and the like of the second terminal device.

S408: The second terminal device sends the second trajectory information to the access network device.

A specific process in which the second terminal device sends the second trajectory information based on the second trajectory request message is not limited in this disclosure, and details are not described herein.

In addition, the foregoing step execution sequence is merely an example, and a specific step execution sequence is not limited in this disclosure. For example, S407 and S408 may be performed after S401 to S406, or S407 and S408 may be performed before S401 to S406, or S407 and S408 may be performed in any step between S401 and S406. In this disclosure, a same principle is also applied to the following examples, and details are not described herein again.

In this disclosure, the access network device may determine the first trajectory information of the first terminal device based on the second trajectory information of the second terminal device. In a possible implementation, the access network device may use the second trajectory information as the first trajectory information. In a possible implementation, the access network device may infer the first trajectory information of the first terminal device based on the second trajectory information of the second terminal device.

Further, when the trajectory of the second terminal device matches the trajectory of the one or more terminal devices, the access network device may determine trajectory information of the one or more terminal devices based on the second trajectory information of the second terminal device.

In this disclosure, the access network device may use the first trajectory information of the first terminal device in scenarios such as AI-based mobility enhancement, load balancing, and network energy saving. A specific process is not limited in this disclosure, and details are not described herein.

Optionally, when determining the first trajectory information of the first terminal device based on the second trajectory information of the second terminal device, the access network device may determine the first trajectory information of the first terminal device based on second trajectory information of the second terminal device in a period of time. The period of time may be agreed on in a protocol, or may be indicated by the access network device to the UE, or may be implemented by using a mechanism such as the timer. This is not limited.

Optionally, after receiving the second indication information, the first terminal device may further continue to monitor the second trajectory information of the second terminal device, to provide an indication for the access network device when determining that the trajectory of the first terminal device no longer matches the trajectory of the second terminal device.

Specifically, in S409, the first terminal sends third indication information to the access network device if the second trajectory information no longer matches the first trajectory information.

The third indication information indicates that the trajectory of the first terminal device no longer matches the trajectory of the second terminal device.

In a possible implementation, when it is determined that second trajectory information of the second terminal device within second duration no longer matches first trajectory information of the first terminal device within the second duration, the third indication information may be sent. The second duration may be a time length, or may be a time period. For example, when the second duration is a time length, the second duration may be, for example, 30 seconds, 60 seconds, or 2 minutes; or when the second duration is a time period, the second duration may be, for example, from 10:10:10 in 2021 to 10:12:10 in 2021. The second duration may be configured by the access network device, may be agreed on in a protocol, or may be autonomously determined by the first terminal device. This is not limited in this disclosure.

In a possible implementation, the first terminal device determines, based on the RSRP of the broadcast signal of the second terminal device, whether the second trajectory information still matches the first trajectory information. For example, when the RSRP that is of the broadcast signal of the second terminal device and that is measured by the first terminal device is less than the preset threshold, and the duration exceeds the preset time threshold, it may be determined that the second trajectory information no longer matches the first trajectory information.

In another possible implementation, the first terminal device may determine, based on the trajectory similarity between the first trajectory information and the second trajectory information, whether the first trajectory information matches the second trajectory information. For details, refer to descriptions in S404. Details are not described herein again.

Optionally, in S410, the access network device sends fourth indication information to the first terminal device, and correspondingly, the first terminal device receives the fourth indication information from the access network device.

The fourth indication information indicates to change the trajectory information reporting periodicity of the first terminal device from the second periodicity to a third periodicity, where the third periodicity is less than the second periodicity; or the fourth indication information indicates the first terminal device to enable the trajectory information reporting. The third periodicity herein may be equal to the first periodicity, or may not be equal to the first periodicity. This is not limited in this disclosure.

The first terminal device may report the trajectory information to the access network device based on the fourth indication information. A specific process is not described.

In this disclosure, if the access network device does not send the fourth indication information to the first terminal device, and when the first terminal device determines that the second trajectory information of the second terminal device does not match the first trajectory information of the first terminal device, if the first terminal device currently reports the trajectory information of the first terminal device to the access network device based on the second periodicity, or suspends the trajectory information reporting, the first terminal device may report the trajectory information of the first terminal device to the access network device based on the third periodicity when not receiving the fourth indication information.

The method provided in this disclosure may be further applied to a scenario in which the second terminal device performs cell handover. For example, the second terminal device is handed over to a target cell. In this case, an access network device to which a currently connected cell belongs may further indicate, to an access network device to which the target cell belongs, that the trajectory of the one or more terminal devices matches the trajectory of the second terminal device. If the first terminal device is also handed over to the target cell, after being handed over to the target cell, the first terminal device continues to report the trajectory information based on the second periodicity or suspends the trajectory information reporting, so that after the handover, the quantity of trajectory information reporting times can also be reduced, electric energy of the first terminal device can be saved, and the air interface resource occupation can be reduced. For details, refer to the following descriptions in S707. Details are not described herein.

The foregoing method is implemented, so that when determining that the second trajectory information of the second terminal device matches the first trajectory information of the first terminal device, the first terminal device indicates, to the access network device by using the first indication information, that the trajectory of the first terminal device matches the trajectory of the second terminal device. In this case, the access network device may indicate, by using the second indication information, the first terminal device to increase the trajectory information reporting periodicity, to reduce the quantity of trajectory information reporting times, avoid frequent trajectory information reporting performed by the first terminal device, save the electric energy of the first terminal device, and reduce the air interface resource occupation. In a possible scenario, the second terminal device is an intelligent vehicle. Because the intelligent vehicle has abundant sensors, the intelligent vehicle is more suitable for trajectory prediction, and trajectory prediction precision is high. The access network device may determine the trajectory information of the first terminal device based on the trajectory information of the second terminal device.

FIG. 6 is a schematic flowchart of an information transmission method according to this disclosure.

In the method procedure, a first terminal device may obtain trajectory information of a second terminal device, and determine whether the trajectory information of the second terminal device matches trajectory information of the first terminal device. If the trajectory information of the second terminal device matches the trajectory information of the first terminal device, the first terminal device may indicate, to the second terminal device, that a trajectory of the first terminal device matches a trajectory of the second terminal device. Then, the second terminal device indicates, to an access network device, that trajectories of the first terminal device and the second terminal device match. In this case, the access network device may indicate the first terminal device to increase a trajectory information reporting periodicity, to reduce a quantity of trajectory information reporting times; or indicate the first terminal device to suspend trajectory information reporting. A specific procedure includes the following steps.

S601: The access network device sends a first trajectory request message to the first terminal device.

S602: The first terminal device reports first trajectory information to the access network device.

S601 and S602 are optional operations. To be specific, before S603, the first terminal device may not start to report the first trajectory information to the access network device. Alternatively, S601 is optional. For example, a positioning periodicity and a first periodicity may be agreed on in a protocol, and do not need to be indicated by the access network device to the first terminal device by using signaling.

S603: The second terminal device sends second trajectory information.

S604: The first terminal device obtains the second trajectory information of the second terminal device, and determines whether the second trajectory information matches the first trajectory information.

For specific content of S601 to S604, refer to descriptions in S401 to S404. Details are not described herein again.

S605: The first terminal device sends fifth indication information to the second terminal device if the second trajectory information of the second terminal device matches the first trajectory information of the first terminal device, and correspondingly, the second terminal device receives the fifth indication information from the first terminal device.

The fifth indication information indicates that the trajectory of the first terminal device matches the trajectory of the second terminal device.

In a possible implementation, second trajectory information of the second terminal device within first duration may be matched with first trajectory information of the first terminal device within the first duration. For specific content of the first duration, refer to descriptions in S405. Details are not described herein again.

It should be noted that if the second trajectory information does not match the first trajectory information, the first terminal device does not need to send the fifth indication information to the second terminal device.

In a possible implementation, the fifth indication information further indicates first identification information of the first terminal device. The first identification information may include at least one of a cell identifier of a first cell in which the first terminal device is located and a C-RNTI of the first terminal device. The cell identifier of the first cell may be referred to as a first cell identifier. The C-RNTI of the first terminal device may be referred to as a first C-RNTI.

In another possible implementation, the fifth indication information and the first identification information are same information. Specifically, the first indication information may specifically indicate the first identification information of the first terminal device. When the fifth indication information specifically indicates the first identification information, and the second terminal device obtains the first identification information, the second terminal device may determine that the trajectory of the first terminal device matches the trajectory of the second terminal device. In this implementation, it is equivalent to that the fifth indication information implicitly indicates that the trajectory of the first terminal device matches the trajectory of the second terminal device.

In this disclosure, the first identification information may not be indicated by using the fifth indication information, and the first identification information and the fifth indication information are carried by using two independent information elements.

The first terminal device may send the fifth indication information to the second terminal device over a sidelink. The fifth indication information may be carried by using a DRB, or may be carried by using an SRB. This is not limited in this disclosure.

A transmission resource used by the first terminal device to send the fifth indication information over the sidelink may be allocated by the access network device to the first terminal device, or may be obtained by the first terminal device through resource perception. For example, the access network device configures, for the first terminal device by using RRC signaling, a grant for a sidelink transmission resource, and the sidelink transmission resource includes at least one of the following: a periodicity, a time offset, a frequency offset, or the like. Alternatively, the first terminal device perceives an available sidelink transmission resource set, selects a resource for data transmission, and notifies another terminal device of resource reservation information. Specific content of a sidelink transmission resource allocation manner is not limited in this disclosure, and details are not described herein.

In this disclosure, the second terminal device may manage one or more terminal devices whose trajectories match the trajectory of the second terminal device. For example, the second terminal device may create a device list. In a possible implementation, the device list is shown in Table 2.

TABLE 2

| Cell 1 | Cell 2 | Cell 3 |
|---|---|---|
| UE 1 | UE 6 | UE 8 |
| UE 2 | UE 7 | UE 9 |
| UE 3 | | |
| UE 4 | | |
| UE 5 | | |

In Table 2, three cells are included, and are respectively the cell 1, the cell 2, and the cell 3.

The one or more terminal devices whose trajectories match the trajectory of the second device may access different cells. Therefore, the second terminal device may use terminal devices in a same cell as one group. In Table 2, the UE 1 to the UE 5 are terminal devices in the cell 1, the UE 6 and the UE 7 are terminal devices in the cell 2, and the UE 8 and the UE 9 are terminal devices in the cell 3.

It is assumed that the second device receives fifth indication information of the UE 10, and the fifth indication information indicates that a trajectory of the UE 10 located in the cell 2 matches the trajectory of the second device. In this case, the second terminal device may add the UE 10 to a column corresponding to the cell 2 in the list.

It is assumed that the second terminal device determines that a trajectory of the UE 5 no longer matches a trajectory of V-UE 1. In this case, the second terminal device may delete the UE 5 from Table 2.

S606: The second terminal device sends first indication information to the access network device.

In a possible implementation, the first indication information and the fifth indication information may be information of same content. To be specific, the first terminal device sends the first indication information to the second terminal device, and the second terminal device forwards the first indication information to the access network device.

In another possible implementation, the first indication information is determined based on the fifth indication information. In this implementation, the first indication information may indicate that the trajectory of the one or more terminal devices matches the trajectory of the second terminal device, and the one or more terminal devices include the first terminal device.

In addition to indicating that the trajectory of the first terminal device matches the trajectory of the second terminal device, the first indication information may further indicate identification information of the one or more terminal devices.

Alternatively, the first indication information and the identification information of the one or more terminal devices are same information. In other words, the first indication information may specifically indicate the identification information of the one or more terminal devices. When obtaining the identification information of the one or more terminal devices, the access network device may determine that the trajectory of the one or more terminal devices matches the trajectory of the second terminal device.

When the first indication information indicates the identification information of the one or more terminal devices, the first indication information may indicate identification information of all terminal devices whose trajectories match the trajectory of the second terminal device, or may indicate only identification information of a terminal device that needs to be added or deleted and that is in the terminal devices whose trajectories match the trajectory of the second terminal device.

For example, with reference to the foregoing Table 2, the second terminal device manages the one or more terminal devices whose trajectories match the trajectory of the second terminal device, and the one or more terminal devices are located in the device list. The first indication information may indicate the identification information of the one or more terminal devices in the device list, or the first indication information may indicate change amount information of the device list.

For example, when the UE 10 is newly added to Table 2, the second terminal device may indicate identification information of the UE 1 to the UE 10 by using the first indication information, or may indicate only identification information (e.g., the change amount information) of the UE 10.

Optionally, in S607, the access network device sends second indication information to the first terminal device, and correspondingly, the first terminal device receives the second indication information from the access network device.

In this disclosure, if the access network device does not send the second indication information to the first terminal device, and when the first terminal device determines that the second trajectory information of the second terminal device matches the first trajectory information of the first terminal device, the first terminal device may actively change a trajectory information reporting periodicity of the first terminal device to a second periodicity, or suspend the trajectory information reporting when not receiving the second indication information.

For specific content of S607, refer to descriptions in S406. Details are not described herein again.

S608: The access network device sends a second trajectory request message to the second terminal device, where the second trajectory request message indicates the second terminal device to report the second trajectory information of the second terminal device.

For specific content of S608, refer to descriptions in S407. Details are not described herein again.

S609: The second terminal device sends the second trajectory information to the access network device.

For specific content of S609, refer to descriptions in S408. Details are not described herein again.

S610: The first terminal device sends third indication information to the second terminal device if the second trajectory information no longer matches the first trajectory information.

The third indication information indicates that the trajectory of the first terminal device no longer matches the trajectory of the second terminal device. Second duration may be configured by the access network device, may be agreed on in a protocol, or may be autonomously determined by the first terminal device. This is not limited in this disclosure.

For specific content of S610, refer to descriptions in S409. Details are not described herein again.

S611: The second terminal device sends sixth indication information to the access network device.

The sixth indication information indicates that a trajectory of at least one terminal device no longer matches the trajectory of the second terminal device, and the at least one terminal device includes the first terminal device.

In another implementation, S611 may be alternatively replaced with the following step.

The second terminal device forwards the third indication information to the access network device.

Optionally, in S612, the access network device sends fourth indication information to the first terminal device, and correspondingly, the first terminal device receives the fourth indication information from the access network device.

In this disclosure, if the access network device does not send the fourth indication information to the first terminal device, and when the first terminal device determines that the second trajectory information of the second terminal device does not match the first trajectory information of the first terminal device, if the first terminal device currently reports the trajectory information of the first terminal device to the access network device based on the second periodicity, or suspends the trajectory information reporting, the first terminal device may report the trajectory information of the first terminal device to the access network device based on a third periodicity when not receiving the fourth indication information.

For specific content of S612, refer to descriptions in S410. Details are not described herein again.

The method provided in this disclosure may be further applied to a scenario in which the second terminal device performs cell handover. For example, the second terminal device is handed over to a target cell. In this case, an access network device to which a currently connected cell belongs may further indicate, to an access network device to which the target cell belongs, that the trajectory of the one or more terminal devices matches the trajectory of the second terminal device. If the first terminal device is also handed over to the target cell, after being handed over to the target cell, the first terminal device continues to report the trajectory information based on the second periodicity or suspends the trajectory information reporting, so that after the handover, the quantity of trajectory information reporting times can also be reduced, electric energy of the first terminal device can be saved, and air interface resource occupation can be reduced. For details, refer to the following descriptions in S707. Details are not described herein.

The foregoing method is implemented, so that when determining that the second trajectory information of the second terminal device matches the first trajectory information of the first terminal device, the first terminal device provides an indication for the second terminal device, and then the second terminal device indicates, to the access network device by using the first indication information, that the trajectory of the first terminal device matches the trajectory of the second terminal device. In this case, the access network device may indicate, by using the second indication information, the first terminal device to increase the trajectory information reporting periodicity, to reduce the quantity of trajectory information reporting times; or indicate the first terminal device to suspend the trajectory information reporting, to avoid frequent trajectory information reporting performed by the first terminal device, save the electric energy of the first terminal device, and reduce the air interface resource occupation.

Figure 7:
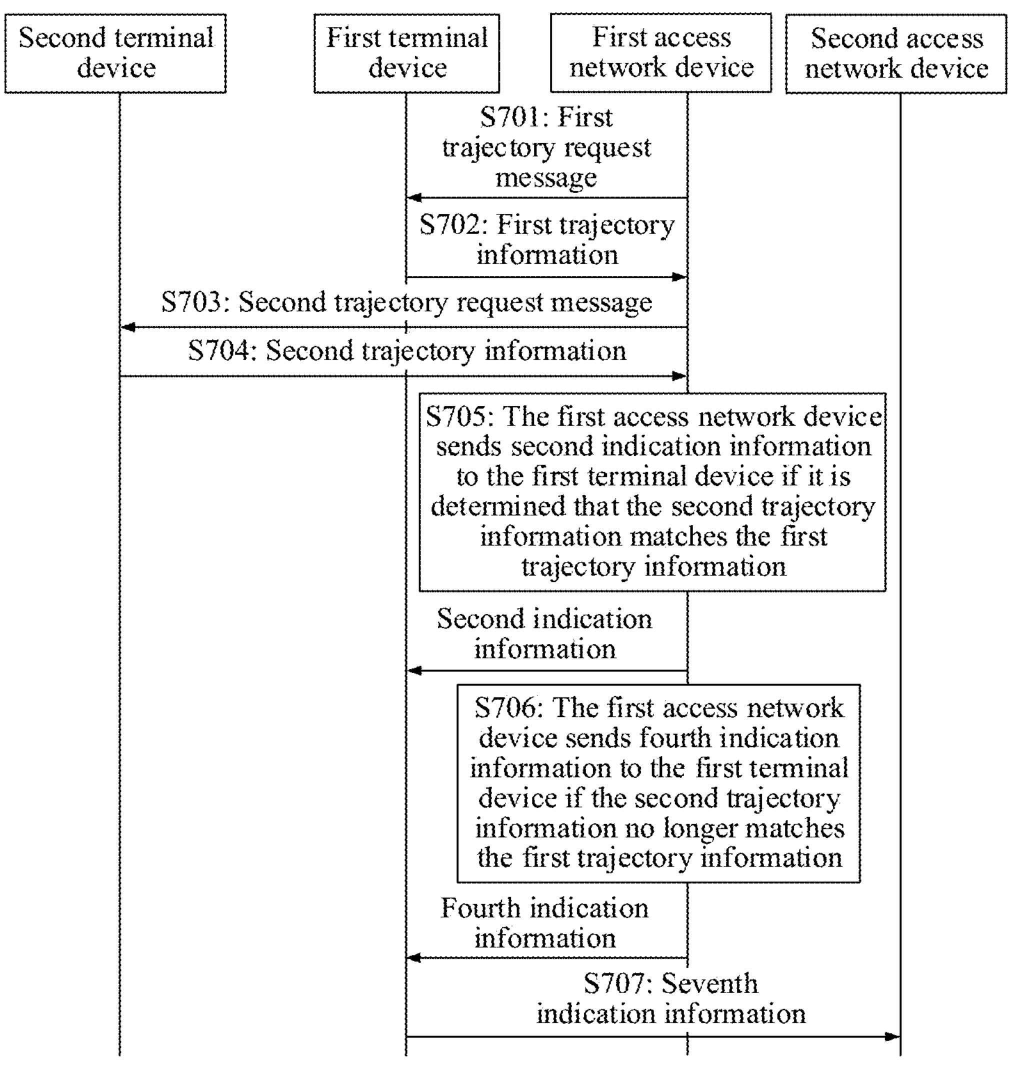
FIG. 7 is a schematic flowchart of an information transmission method according to this disclosure.

FIG. 7 is a schematic flowchart of an information transmission method according to this disclosure.

In the method procedure, an access network device may obtain trajectory information of a first terminal device and trajectory information of a second terminal device, and determine whether the trajectory information of the first terminal device matches the trajectory information of the second terminal device. If the trajectory information of the first terminal device matches the trajectory information of the second terminal device, a first access network device may indicate the first terminal device to increase a trajectory information reporting periodicity, to reduce a quantity of trajectory information reporting times. A specific procedure includes the following steps.

S701: The access network device sends a first trajectory request message to the first terminal device.

S702: The first terminal device reports first trajectory information to the access network device, and correspondingly, the first access network device obtains the first trajectory information of the first terminal device.

For specific content of S701 and S702, refer to descriptions in S401 and S402. Details are not described herein again.

S703: The access network device sends a second trajectory request message to the second terminal device.

The second trajectory request message may include a positioning periodicity and a trajectory information reporting periodicity that are configured for the second terminal device.

Optionally, the second trajectory request message may further indicate reporting speed information, trip planning information, predicted trajectory information, and the like of the second terminal device.

For specific content of S703, refer to descriptions in S407. Details are not described herein again.

S704: The second terminal device reports second trajectory information to the access network device, and correspondingly, the first access network device obtains the second trajectory information of the second terminal device.

For specific content of S704, refer to descriptions in S408. Details are not described herein again.

S705: The first access network device sends second indication information to the first terminal device if the second trajectory information of the second terminal device matches the first trajectory information of the first terminal device.

The second indication information indicates to change the trajectory information reporting periodicity of the first terminal device to a second periodicity, the second periodicity is greater than a first periodicity, and the first periodicity is the trajectory information reporting periodicity before first indication information is sent.

There may be a plurality of methods for specifically determining, by the first access network device, that the second trajectory information matches the first trajectory information. For example, whether the first trajectory information matches the second trajectory information may be determined based on a trajectory similarity between the first trajectory information and the second trajectory information. Methods for calculating the trajectory similarity include a Euclidean distance, a cosine similarity, a Pearson correlation coefficient, and the like. This is not limited in this disclosure. For details, refer to descriptions in S404. Details are not described herein again.

As described in S406, the first access network device may further use one or more terminal devices whose trajectories match a trajectory of the second terminal device as a device list. In this case, the first access network device may further add the first terminal device to the device list.

In a possible implementation, the first access network device only needs to analyze whether a trajectory of the first terminal device near the second terminal device matches the trajectory of the second terminal device. For example, in a time period, when determining that a distance between the first terminal device and the second terminal device is less than or equal to a preset distance, the first access network device determines whether the trajectory of the first terminal device matches the trajectory of the second terminal device.

The first access network device may further determine, based on average speeds of the second terminal device and the first terminal device in a period of time (for example, the average speed is calculated every 3 seconds in 9 seconds) and when an absolute value of a difference between the average speeds of the second terminal device and the first terminal device is less than or equal to a preset speed threshold, whether the trajectory of the first terminal device matches the trajectory of the second terminal device. This can reduce complexity of participating in trajectory similarity calculation, so that a calculation amount is reduced and efficiency is improved.

S706: The first access network device sends fourth indication information to the first terminal device if the second trajectory information no longer matches the first trajectory information.

In addition, as described in S406, the first access network device may further use the one or more terminal devices whose trajectories match the trajectory of the second terminal device as the device list. In this case, the first access network device may further delete the first terminal device from the device list.

For other content of S706, refer to descriptions in S409 and S410. Details are not described herein again.

In this disclosure, the second terminal device may further perform cell handover, for example, may be handed over to a cell managed by a second access network device. In this case, the first access network device may further perform the following procedure.

S707: If it is determined that the second terminal device is handed over to the cell managed by the second access network device, the first access network device sends seventh indication information to the second access network device.

The seventh indication information indicates that the trajectory of the one or more terminal devices matches the trajectory of the second terminal device, and the one or more terminal devices include the first terminal device.

In a possible implementation, the one or more terminal devices indicated by the seventh indication information include a terminal device that is handed over to a same target cell as the second terminal device, and also include a terminal device that is handed over to a different target cell from the second terminal device.

In a possible implementation, the one or more terminal devices indicated by the seventh indication information include only the terminal device that is handed over to the same target cell as the second terminal device.

For example, it is assumed that the one or more terminal devices whose trajectories match the trajectory of the second terminal device are located in a device list shown in Table 3.

TABLE 3

| Cell 1 | Cell 2 | Cell 3 |
|---|---|---|
| UE 1 | UE 6 | UE 9 |
| UE 2 | UE 7 | UE 10 |
| UE 3 | UE 8 | |
| UE 4 | | |
| UE 5 | | |

It is assumed that the target cell to which the second terminal device is handed over is the cell 1, a target cell to which the UE 6 to the UE 8 are handed over is the cell 2, and a target cell to which the UE 9 and the UE 10 are handed over is the cell 3. In this case, the seventh indication information may indicate the UE 1 to the UE 10, to be specific, indicate all terminal devices in the device list. Alternatively, the seventh indication information may indicate the UE 1 to the UE 5, to be specific, indicate terminal devices that are in the device list and that are handed over to the same target cell as the second terminal device.

The foregoing method is implemented, so that when determining that the second trajectory information of the second terminal device matches the first trajectory information of the first terminal device, the first access network device may indicate, by using the second indication information, the first terminal device to increase the trajectory information reporting periodicity, to reduce the quantity of trajectory information reporting times, avoid frequent trajectory information reporting performed by the first terminal device, and reduce air interface leakage of location information of the first terminal device.

In the foregoing embodiments provided in this application, the methods provided in embodiments of this application are separately described from a perspective of interaction between devices. To implement functions in the methods provided in the foregoing embodiments of this application, the access network device or the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

The module division in embodiments of this application is an example, and is merely logical function division. In actual implementation, there may be another division manner. In addition, functional modules in embodiments of this application may be integrated into one processor, or may exist alone physically, or two or more modules may be integrated into one module. The integrated module may be implemented in a form of hardware, or may be implemented in a form of a software functional module.

Figure 8:
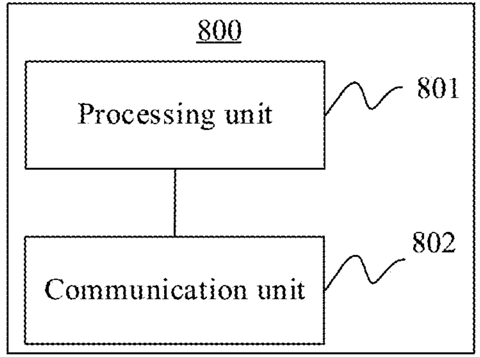
FIG. 8 is a diagram of a structure of a communication apparatus according to this disclosure.

Same as the foregoing concept, as shown in FIG. 8, an embodiment of this application further provides a communication apparatus 800, configured to implement a function of the access network device or the terminal device in the foregoing methods. A form of the communication apparatus is not limited, and the communication apparatus may be a hardware structure, a software module, or a combination of a hardware structure and a software module. For example, the apparatus may be a software module or a chip system. In this embodiment of this application, the chip system may include a chip, or may include a chip and another discrete component. The apparatus 800 may include a processing unit 801 and a communication unit 802.

In this embodiment of this application, the communication unit may also be referred to as a transceiver unit, and may include a sending unit and/or a receiving unit, which are respectively configured to perform sending and receiving steps performed by the access network device, the first terminal device, or the second terminal device in the foregoing method embodiments.

Figure 9:
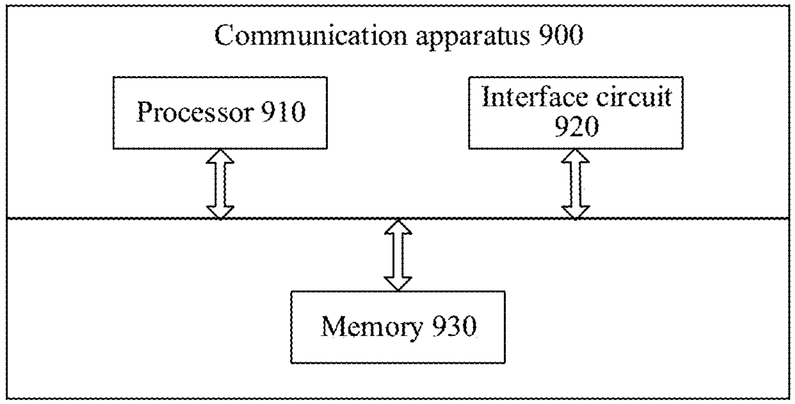
FIG. 9 is a diagram of a structure of a communication apparatus according to this disclosure.

The following describes in detail the communication apparatus provided in this embodiment of this application with reference to FIG. 8 to FIG. 9. It should be understood that descriptions of the apparatus embodiments correspond to descriptions of the method embodiments. Therefore, for content that is not described in detail, refer to the foregoing method embodiments. For brevity, details are not described herein again.

The communication unit may also be referred to as a transceiver apparatus. The processing unit may also be referred to as a processing module, a processing apparatus, or the like. Optionally, a component configured to implement a receiving function in the communication unit 802 may be considered as the receiving unit, and a component configured to implement a sending function in the communication unit 802 may be considered as the sending unit. That is, the communication unit 802 includes the receiving unit and the sending unit. The communication unit sometimes may be implemented as a pin, a transceiver machine, a transceiver, a transceiver circuit, or the like. The processing unit sometimes may be implemented as a processor, a processing board, or the like. The receiving unit sometimes may be implemented as a pin, a receiver machine, a receiver, a receiving circuit, or the like. The sending unit sometimes may be implemented as a pin, a transmitter machine, a transmitter, a transmitter circuit, or the like.

When the communication apparatus 800 performs the function of the access network device in the procedure shown in FIG. 4 or FIG. 6 in the foregoing embodiments:

the processing unit is configured to receive first indication information by using the communication unit, where the first indication information indicates that a trajectory of a first terminal device matches a trajectory of a second terminal device; and the processing unit is configured to send second indication information to the first terminal device by using the communication unit, where the second indication information indicates to change a trajectory information reporting periodicity of the first terminal device from a first periodicity to a second periodicity, or the second indication information indicates to suspend trajectory information reporting, and the second periodicity is greater than the first periodicity.

When the communication apparatus 800 performs a function of the first terminal device in the procedure shown in FIG. 4 or FIG. 6 in the foregoing embodiments:

the communication unit is configured to: obtain second trajectory information of a second terminal device; and send first indication information if the second trajectory information matches first trajectory information of a first terminal device, where the first indication information indicates that a trajectory of the first terminal device matches a trajectory of the second terminal device; and the processing unit is configured to: determine to change a trajectory information reporting periodicity to a second periodicity, or suspend trajectory information reporting, where the second periodicity is greater than a first periodicity, and the first periodicity is the trajectory information reporting periodicity before the first indication information is sent.

When the communication apparatus 800 performs a function of the second terminal device in the procedure shown in FIG. 4 or FIG. 6 in the foregoing embodiments:

the processing unit is configured to determine first indication information; and the communication unit is configured to send the first indication information to the access network device, where the first indication information indicates that a trajectory of a first terminal device matches a trajectory of a second terminal device.

When the communication apparatus 800 performs a function of the first access network device in the procedure shown in FIG. 7 in the foregoing embodiments:

- the processing unit is configured to, obtain first trajectory information of a first terminal device, and obtain second trajectory information of a second terminal device by using the communication unit; and
- the processing unit is configured to send second indication information to the first terminal device by using the communication unit if the second trajectory information matches the first trajectory information, where the second indication information indicates to change a trajectory information reporting periodicity to a second periodicity, the second periodicity is greater than a first periodicity, and the first periodicity is the trajectory information reporting periodicity before first indication information is sent.

The foregoing is merely an example. The processing unit 801 and the communication unit 802 may further perform other functions. For more detailed descriptions, refer to related descriptions in the method embodiment shown in FIG. 4, FIG. 6, or FIG. 7. Details are not described herein again.

FIG. 9 shows a communication apparatus 900 according to an embodiment of this application. The communication apparatus shown in FIG. 9 may be an implementation of a hardware circuit of the communication apparatus shown in FIG. 8. The communication apparatus may be applicable to the foregoing flowchart, and performs the function of the first terminal device, the second terminal device, or the access network device in the foregoing method embodiments. For ease of description, FIG. 9 shows only main components of the communication apparatus.

As shown in FIG. 9, the communication apparatus 900 includes a processor 910 and an interface circuit 920. The processor 910 and the interface circuit 920 are coupled to each other. It may be understood that the interface circuit 920 may be a transceiver, a pin, an interface circuit, or an input/output interface. Optionally, the communication apparatus 900 may further include a memory 930, and the memory 930 is configured to: store instructions executed by the processor 910, or store input data needed by the processor 910 to run the instructions, or store data generated after the processor 910 runs the instructions. Optionally, a part or all of the memory 930 may be located in the processor 910.

When the communication apparatus 900 is configured to implement the method shown in FIG. 4, FIG. 6, or FIG. 7, the processor 910 is configured to implement a function of the processing unit 801, and the interface circuit 920 is configured to implement a function of the communication unit 802.

When the communication apparatus is a chip used in a terminal device, the chip in the terminal device implements the function of the terminal device in the foregoing method embodiments. The chip in the terminal device receives information from another module (for example, a radio frequency module or an antenna) in the terminal device, where the information is sent by the access network device to the terminal device. Alternatively, the chip in the terminal device sends information to another module (for example, a radio frequency module or an antenna) in the terminal device, where the information is sent by the terminal device to the access network device.

When the communication apparatus is a chip used in the access network device, the chip in the access network device implements the function of the access network device in the foregoing method embodiments. The chip in the access network device receives information from another module (for example, a radio frequency module or an antenna) in the access network device, where the information is sent by a terminal device to the access network device. Alternatively, the chip in the access network device sends information to another module (for example, a radio frequency module or an antenna) in the access network device, where the information is sent by the access network device to a terminal device.

It may be understood that the processor in this disclosure may be a central processing unit, or may be another general-purpose processor, a digital signal processor, an application-specific integrated circuit or another programmable logic device, a transistor logic device, a hardware component, or any combination thereof. The general-purpose processor may be a microprocessor, or may be any conventional processor.

The memory in this disclosure may be a random access memory, a flash memory, a read-only memory, a programmable read-only memory, an erasable programmable read-only memory, an electrically erasable programmable read-only memory, a register, a hard disk, a removable hard disk, or a storage medium of any other form well-known in the art.

A person skilled in the art should understand that embodiments of this disclosure may be provided as a method, a system, or a computer program product. Therefore, this disclosure may use a form of hardware-only embodiments, software-only embodiments, or embodiments with a combination of software and hardware. In addition, this disclosure may use a form of a computer program product that is implemented on one or more computer-usable storage media (including but not limited to a disk memory, an optical memory, and the like) that include computer-usable program code.

This disclosure is described with reference to the flowcharts and/or block diagrams of the method, the device (including, for example, a system), and the computer program product according to this disclosure. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

It is clear that a person skilled in the art can make various modifications and variations to this disclosure without departing from the scope of this disclosure. Therefore, this disclosure is intended to cover these modifications and variations of this disclosure provided that they fall within the scope of the claims of this disclosure and their equivalent technologies.

What is claimed is:

1. A method, comprising:

receiving first indication information, wherein the first indication information indicates that a trajectory of a first terminal device matches a trajectory of a second terminal device; and sending second indication information to the first terminal device, wherein the second indication information indicates to change a trajectory information reporting periodicity of the first terminal device to a second periodicity, and wherein the second periodicity is greater than a first periodicity, and the first periodicity is the trajectory information reporting periodicity of the first terminal device before the first indication information is sent.

2. The method according to claim 1, wherein receiving the first indication information comprises:

receiving the first indication information from the first terminal device, wherein the first indication information indicates second identification information of the second terminal device.

3. The method according to claim 1, wherein the first indication information indicates that a trajectory of a plurality of terminal devices matches the trajectory of the second terminal device, and the plurality of terminal devices comprises the first terminal device.

4. The method according to claim 3, wherein receiving the first indication information comprises:

receiving the first indication information from the second terminal device, wherein the first indication information indicates identification information of one or more of the plurality of terminal devices.

5. The method according to claim 1, further comprising:

determining trajectory information of the first terminal device based on trajectory information of the second terminal device.

6. The method according to claim 1, further comprising:

receiving third indication information, wherein the third indication information indicates that the trajectory of the first terminal device no longer matches the trajectory of the second terminal device.

7. The method according to claim 6, wherein the third indication information is from the first terminal device or the second terminal device.

8. An apparatus, comprising:

at least one processor, and at least one memory storing instructions for execution by the at least one processor, wherein, when executed, the instructions cause the apparatus to:

receive first indication information, wherein the first indication information indicates that a trajectory of a first terminal device matches a trajectory of a second terminal device; and send second indication information to the first terminal device, wherein the second indication information indicates to change a trajectory information reporting periodicity of the first terminal device to a second periodicity, and wherein the second periodicity is greater than a first periodicity, and the first periodicity is the trajectory information reporting periodicity of the first terminal device before the first indication information is sent.

9. The apparatus according to claim 8, wherein, when executed, to receive the first indication information, the instructions cause the apparatus to:

receive the first indication information from the first terminal device, wherein the first indication information indicates second identification information of the second terminal device.

10. The apparatus according to claim 8, wherein the first indication information indicates that a trajectory of a plurality of terminal devices matches the trajectory of the second terminal device, and the plurality of terminal devices comprises the first terminal device.

11. The apparatus according to claim 10, wherein, when executed, to receive the first indication information, the instructions cause the apparatus to:

receive the first indication information from the second terminal device, wherein the first indication information indicates identification information of one or more of the plurality of terminal devices.

12. The apparatus according to claim 8, wherein, when executed, the instructions cause the apparatus to:

determine trajectory information of the first terminal device based on trajectory information of the second terminal device.

13. The apparatus according to claim 8, wherein, when executed, the instructions further cause the apparatus to:

receive third indication information, wherein the third indication information indicates that the trajectory of the first terminal device no longer matches the trajectory of the second terminal device.

14. The apparatus according to claim 13, wherein the third indication information is from the first terminal device.

15. The apparatus according to claim 13, wherein the third indication information is from the second terminal device.

16. A non-transitory computer readable storage medium storing instructions that are executable by at least one processor, wherein execution of the instructions causes an apparatus to:

receive first indication information, wherein the first indication information indicates that a trajectory of a first terminal device matches a trajectory of a second terminal device; and send second indication information to the first terminal device, wherein the second indication information indicates to change a trajectory information reporting periodicity of the first terminal device to a second periodicity, and wherein the second periodicity is greater than a first periodicity, and the first periodicity is the trajectory information reporting periodicity of the first terminal device before the first indication information is sent.

17. The non-transitory computer readable storage medium according to claim 16, wherein receiving the first indication information comprises:

receiving the first indication information from the first terminal device, wherein the first indication information indicates second identification information of the second terminal device.

18. The non-transitory computer readable storage medium according to claim 16, wherein the first indication information indicates that a trajectory of a plurality of terminal devices matches the trajectory of the second terminal device, and the plurality of terminal devices comprises the first terminal device.

19. The non-transitory computer readable storage medium according to claim 18, wherein receiving the first indication information comprises:

receiving the first indication information from the second terminal device, wherein the first indication information indicates identification information of one or more of the plurality of terminal devices.

20. The non-transitory computer readable storage medium according to claim 16, wherein execution of the instructions causes the apparatus to:

determine trajectory information of the first terminal device based on trajectory information of the second terminal device.

* * * * *